(12) United States Patent
Damsgaard

(10) Patent No.: US 12,506,915 B2
(45) Date of Patent: Dec. 23, 2025

(54) MULTI-USER MEDIA PLAYBACK SYSTEM

(71) Applicant: Bang & Olufsen A/S, Struer (DK)

(72) Inventor: Morten Damsgaard, Charlottenlund (DK)

(73) Assignee: BANG & OLUFSEN A/S, Struer (DK)

( * ) Notice: Subject to any disclaimer, the term of this patent is extended or adjusted under 35 U.S.C. 154(b) by 0 days.

(21) Appl. No.: 18/710,454

(22) PCT Filed: Nov. 22, 2022

(86) PCT No.: PCT/EP2022/082796
§ 371 (c)(1),
(2) Date: May 15, 2024

(87) PCT Pub. No.: WO2023/094375
PCT Pub. Date: Jun. 1, 2023

(65) Prior Publication Data
US 2025/0024090 A1    Jan. 16, 2025

(30) Foreign Application Priority Data
Nov. 24, 2021 (DK) .............................. PA202101117

(51) Int. Cl.
*H04N 21/262* (2011.01)
*G06K 19/06* (2006.01)
*H04N 21/436* (2011.01)

(52) U.S. Cl.
CPC . *H04N 21/26258* (2013.01); *G06K 19/06037* (2013.01); *H04N 21/43615* (2013.01)

(58) Field of Classification Search
None
See application file for complete search history.

(56) References Cited

U.S. PATENT DOCUMENTS

| | | |
|---|---|---|
| 2008/0162668 A1 | 7/2008 | Miller |
| 2008/0291863 A1 | 11/2008 | Agren |
| 2011/0238520 A1* | 9/2011 | Selley ................. G06Q 20/123 705/40 |
| 2012/0254356 A1* | 10/2012 | Kashiwagi ......... G06Q 30/0201 709/217 |

(Continued)

OTHER PUBLICATIONS

International Search Report of the ISA issued in PCT/EP2022/082796, mailed Mar. 7, 2023; ISA/EP.

*Primary Examiner* — James R Marandi
(74) *Attorney, Agent, or Firm* — Harness, Dickey & Pierce, P.L.C.; Anthony G. Fussner

(57) ABSTRACT

A system for providing a multi-user media experience, comprising a jukebox service (4) running on a server (3) accessible through a data network, an entertainment system (1) connected to the server (3), and a hosting application (5) connected to the server (3). The jukebox service (4) is configured to receive instructions from the hosting application to create a jukebox session, communicate a session identifier to the hosting application, receive a connection request from at least one mobile device, each request including the session identifier, receive user input via the mobile devices (6), and communicate instructions to the entertainment system (1) to playback media content based on the user input. According to the invention, there is no need for dedicated jukebox hardware and no need for guests to connect to the host's IT environment.

19 Claims, 4 Drawing Sheets

(56) References Cited

U.S. PATENT DOCUMENTS

| | | |
|---|---|---|
| 2013/0347022 A1* | 12/2013 | Bates ................. G06F 3/0482 |
| | | 725/25 |
| 2015/0089336 A1 | 3/2015 | Sirpal et al. |
| 2015/0220498 A1 | 8/2015 | Munoz et al. |
| 2015/0319288 A1 | 11/2015 | Kahn et al. |
| 2016/0164934 A1 | 6/2016 | Hendon, III et al. |
| 2019/0378485 A1* | 12/2019 | Arefti ..................... G07F 9/10 |
| 2020/0082020 A1 | 3/2020 | Ahlström |

\* cited by examiner

MULTI-USER MEDIA PLAYBACK SYSTEM

CROSS-REFERENCE TO RELATED APPLICATIONS

This application is a 371 U.S. National Phase of International Application No. PCT/EP2022/082796 filed Nov. 22, 2022, which claims priority to Denmark Application No. PA202101117 filed on Nov. 24, 2021. The entire disclosures of the above applications are incorporated herein by reference.

TECHNICAL FIELD OF THE INVENTION

The present invention relates to a media system for providing a multi-user media experience. Specific aspects of the invention relate to a cloud-based service (BeoCloud) accessible from multiple user devices.

BACKGROUND OF THE INVENTION

With technological advances in media streaming, the classical jukebox has evolved to an on-line media access-point that users can interact with using their own mobile devices. Document US 2016/0164934 provides an example of such an "on-line jukebox". According to this approach, users of the system log on to the local device by scanning a QR code provided at the venue. Once logged on, the user can place requests in a queue, much like in a conventional jukebox. The system further allows users to communicate with each other, via an on-line portal accessible for anyone logged on to the local device.

While the system in US 2016/0164934 may be highly suitable for a public venue, such as a bar or restaurant, it requires substantial investment in dedicated hardware on site, specifically adapted to the conditions at the venue. As such, it is not ideal for a private venue, where a host would like to provide a jukebox-like experience to his/her private guests.

Available services for media streaming, such as those for cloud-based music streaming, to some extent provide a solution, in that the host may share a device such as a smartphone or tablet and allow his/her guests to place requests on the device. Other solutions enable guests to access an entertainment system via the host's home Wi-Fi network. However, a drawback with such solutions is that they require users to access dedicated hardware or a dedicated network at the venue. This may not be acceptable from a cyber security or privacy perspective, especially when the venue is a private home.

GENERAL DISCLOSURE OF THE INVENTION

It is an object of the present invention to provide an on-line jukebox with improved cyber security, and which therefore is more appropriate for use in private venues.

According to a first aspect, this and other objects are achieved by a system for providing a multi-user media experience, comprising a jukebox service running on a server accessible through a data network, an entertainment system connected to the server, and a hosting application connected to the server and configured to allow a user to set up a jukebox session. The jukebox service is configured to receive instructions from the hosting application to create a jukebox session, communicate a session identifier to the hosting application, receive connection requests from at least one mobile device, each request including the session identifier, grant each mobile device access to jukebox session, receive user input via the mobile devices, and communicate instructions to the entertainment system to playback media content based on the user input.

According to a second aspect, this and other objects are achieved by a method for providing a multi-user media experience using a jukebox service running on a server accessible through a data network, the method comprising receiving instructions from a hosting application to set up a jukebox session, the instructions specifying an entertainment system, communicating a session identifier to the hosting application, receiving connection requests from at least one mobile device, each request including the session identifier, granting each mobile device access to the jukebox session, receiving user input via the mobile devices, and communicating instructions to the entertainment system to playback media content based on the user input.

By "data network" is intended any remote data connection that allows guests to access the server from their mobile device. In most implementations, the data network will be a Wide Area Network (WAN), and may for example be a TCP/IP network such as the Internet. In this case, access may be provided by a browser using hyper-text transfer protocol (http). The jukebox service running on the server may then be referred to as a "cloud" service, i.e. a software service generally accessible via the Internet.

With a system or method according to the present invention, there is no need for dedicated jukebox hardware at the venue, and also no need for users/guests to connect to any part of the host's IT environment. Instead, the jukebox service, referred to herein as a "BeoCloud" service, will serve as a jukebox session manager, and as a gateway to this jukebox session. The host uses the hosting application to setup the jukebox session matching the needs of his/her home entertainment system and type of event. The users/guests will connect to the server in order to access the jukebox session and communicate input such as comments and music requests. Interaction with the jukebox session may be provided by a web page. The jukebox service (BeoCloud service) will communicate playback instructions to the entertainment system.

The hosting application, the entertainment system, and the users' mobile devices can all be connected to the server on separate network connections. In other words, the hosting app does not need to be on the same local network as the entertainment system. The only requirement is that the three entities (hosting app, entertainment system, and mobile device(s)) have Internet connectivity. It may be Wi-Fi connectivity, cellular 4G or 5G etc., or via Bluetooth connection to an Internet connected device.

The jukebox session may be associated with a dynamic list of media content items for playback, wherein the order of media content items in the list is based on requests received from the mobile devices. All users of connected mobile devices will have access to the list (e.g. via a web page), and can make requests related to the items on the list as well as their relative priority.

The entertainment system may be separately connected to a media content provider, and configured to download content from said content provider, e.g. in accordance with the dynamic list. In this case, the jukebox session may further include a user interface for accessing the content provider, allowing a user to browse available media content to base requests on.

In one embodiment, the entertainment system includes a set of synchronized loudspeakers, one loudspeaker in the set being a leader (master) loudspeaker, and other loudspeakers in the set being follower (slave) loudspeakers, wherein the leader loudspeaker is configured to communicate with the jukebox service, and wherein the follower loudspeakers are configured to communicate with the leader loudspeaker. However, the entertainment system may also consist of one single loudspeaker with streaming capabilities.

The entertainment system may be connected to the internet via a short-range wireless connection, such as Bluetooth, to a separate Internet connected device. However, preferably the entertainment system (or at least a part of it, e.g. one of the loudspeakers) includes embedded circuitry for wired (Ethernet cable) or wireless (Wi-Fi) internet connection. This makes the system even more versatile, as the jukebox service has independent access to each part of the system (host, users, and entertainment system).

The session identifier can be communicated to the mobile devices in various ways. In one embodiment, the hosting application is configured to transmit the session identifier to the mobile devices, e.g. over a Bluetooth connection or other available near field communication. Alternatively, the hosting application is configured to display a QR code representing the session identifier, so that the mobile devices can scan this QR code in order to obtain the session identifier.

BRIEF DESCRIPTION OF THE DRAWINGS

The present invention will be described in more detail with reference to the appended drawings, showing currently preferred embodiments of the invention.

DETAILED DESCRIPTION OF CURRENTLY PREFERRED EMBODIMENTS

The following description relates to a music entertainment system, comprising one or several loudspeakers for music playback. It is noted that the invention is equally relevant for other types of media content. Further, the following description relates to an implementation at a private venue, where a private home-owner is the host of the event.

Systems and methods disclosed in the present application may be implemented as software, firmware, hardware or a combination thereof. Software components may be implemented by a processor that accept computer-readable (also called machine-readable) code containing a set of instructions that when executed by the processor carry out at least parts of a method described herein. The processor may for example be a CPU, a graphics processing unit (GPU), or a programmable DSP unit. The processor may further be associated with a memory (e.g. a hard drive, SSD, RAM and/or ROM) and a bus subsystem for communicating between the processor and memory. The software may reside in the memory during execution thereof by the processor. The software may be distributed on a physical computer storage media (or non-transitory media) or a signal communication media (or transitory media).

Figure 1:
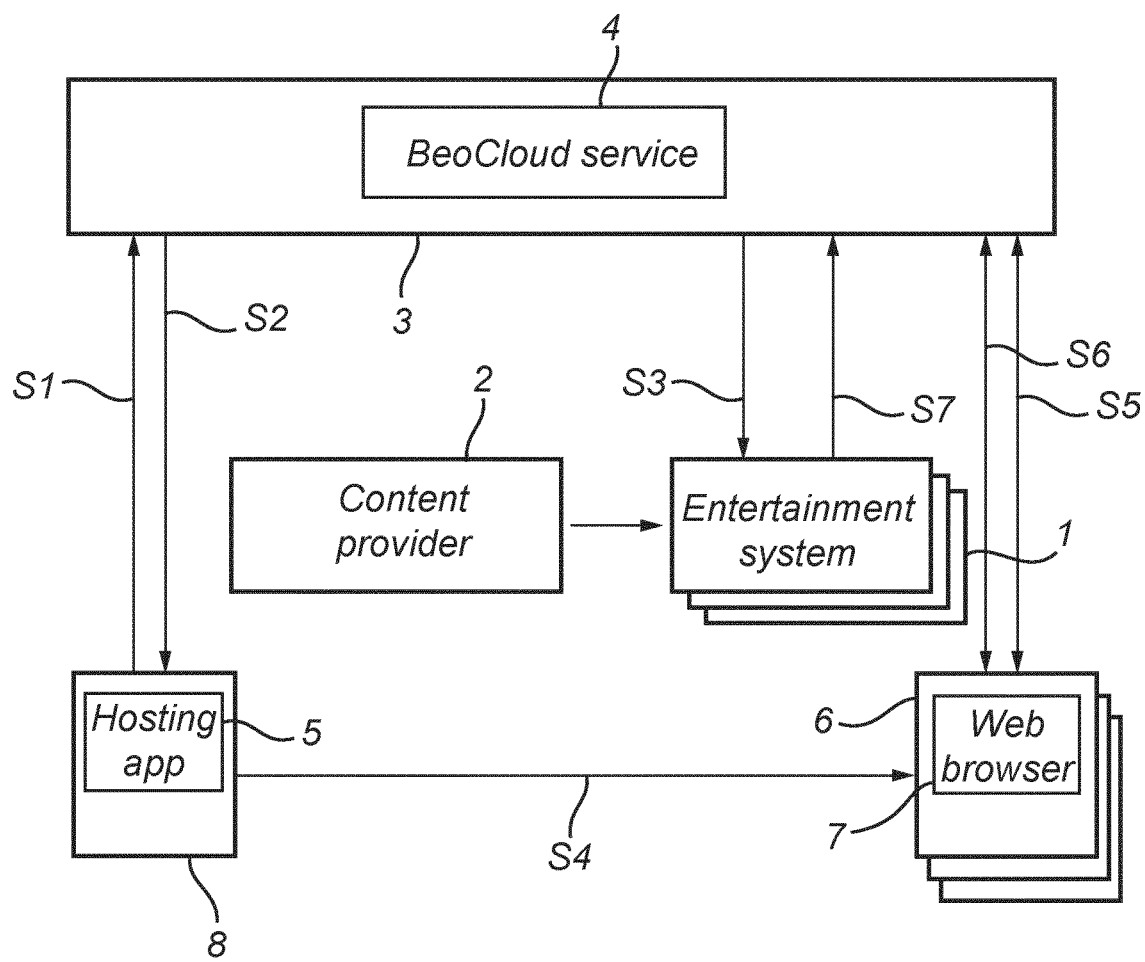
FIG. 1 is a general overview of a system according to an embodiment of the present invention.

The system in FIG. 1 comprises the following main components:

Firstly, there is an entertainment system 1, including one or several components such as loudspeakers provided at the venue, each component capable of playback of media indicated by a dynamic playlist. The entertainment system 1 includes circuitry for wireless communication, and is configured to receive such a playlist e.g. over the Internet. The entertainment system may further be connected to a content provider 2, such as a streaming service, in order to access media for playback, such as songs in a playlist. It is preferable that the entertainment system 1 has a setting for disabling any local user interface such as play/pause, next, previous track, volume, etc.

In one example, the entertainment system 1 includes a set of synchronized loudspeakers, one loudspeaker in the set being a leader loudspeaker, and other loudspeakers in the set being follower loudspeakers. The leader loudspeaker is then configured to receive the playlist and access media content, and then communicate with the follower loudspeakers to provide synchronized playback.

Further, there is an internet connected server 3, running a cloud-based jukebox service 4 referred to herein (without any restriction implied) as a BeoCloud service 4. The BeoCloud service 4 supports the creation of a jukebox session including a dynamic playlist, which can be communicated to the internet connected entertainment system 1. The BeoCloud service 4 here also implements a web page where guests can input preferences to the dynamic playlist, including actions such as adding songs to the playlist, voting songs up and down, and possibly also browsing for music in a dedicated interface.

Finally, there is a hosting application (app) 5, running on a host device 8 such as a smartphone or laptop, and connected to the server 3 and thus to the BeoCloud service 4. The hosting app 5 allows the host of an event to initiate a jukebox session in the BeoCloud service 4, and invite guests to access and interact with the session using their mobile device 6 (laptop, smartphone, etc), e.g. running a web browser 7.

It is noted that any remote data connection that allows guests to access the server 3 from their mobile device 6 would be possible. However, in the present disclosure, the data connection is the Internet, i.e. a TCP/IP network. In this case, access may be provided by a browser 7 using hypertext transfer protocol (http). The jukebox service 4 running on the server 3 is therefore referred to as a "cloud" service, i.e. a software service generally accessible via the Internet.

Figure 2:
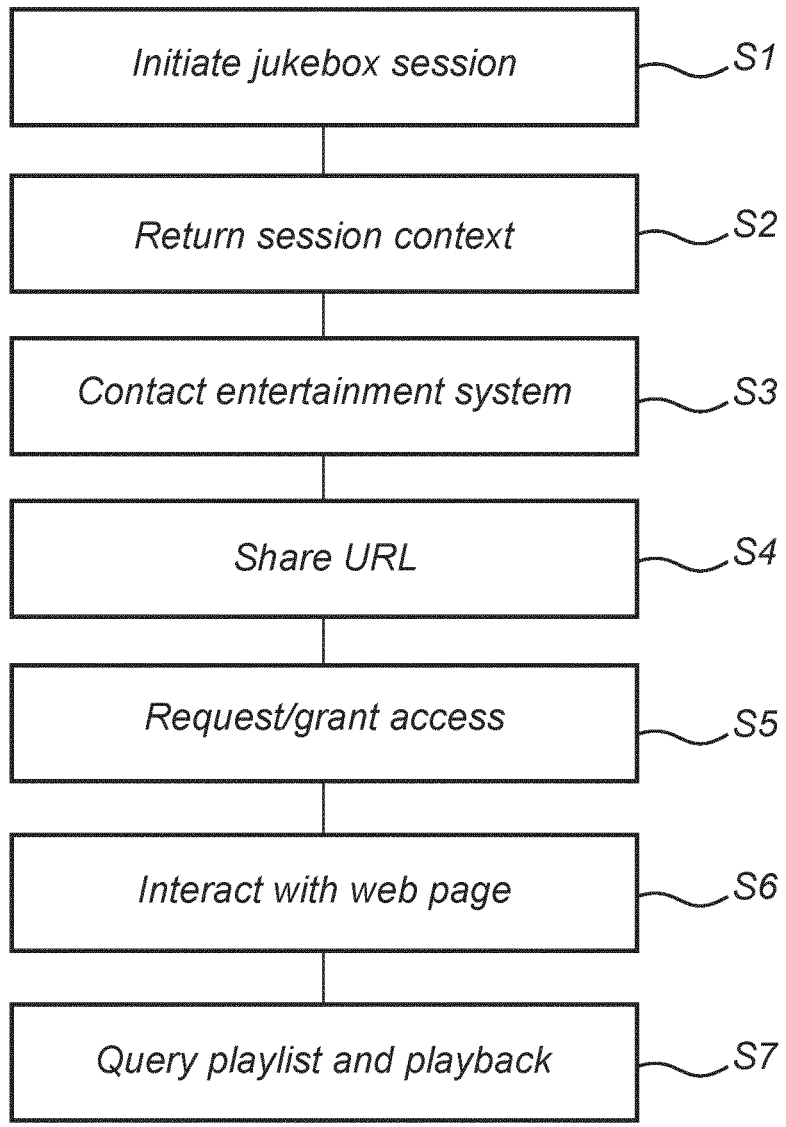
FIG. 2 is a flow chart of operation of the system in FIG. 1.

A basic media playback process enabled by the system in FIG. 1 is outlined in the flow chart in FIG. 2.

First, in step S1, the host enables jukebox mode using the hosting app 5. This will create a new jukebox session in the BeoCloud service 4, which jukebox session is associated with a specific entertainment system 1. The hosting app 5 may allow the host to define a specific entertainment system 1 to be associated with the jukebox session. Alternatively, the jukebox session may be associated with a default entertainment system 1 of a given host.

In step S2, the BeoCloud service 4 returns a session context (a data structure) to the hosting app 5, including a session identifier, here a dynamically generated unique URL (web link) to a specific web page for the jukebox session. The BeoCloud service 4 may also generate a QR code encoding the URL, and return this to the hosting app 5. Without the unique URL (or the QR code), access to the session is not possible. An example of a unique URL is: jukebox.bno.com/session/5738405106532523.

In step S3, the BeoCloud service 4 contacts the entertainment system 1 (here, the leader loudspeaker) and communicates the dynamic playlist of the new jukebox session. In one embodiment, the BeoCloud service 4 communicates with the entertainment system 1 via a communication hub allowing "push" communication with the entertainment system 1. Such a communication hub can be based on IoT technology. By implementing push communication, the BeoCloud service 4 can communicate efficiently and in real time with the entertainment system 1.

In step S4, the hosting app 5 is used to share the URL or the QR code with one or several mobile devices 6. For example, a guest can scan the QR code using his/her smartphone camara. Or, the URL may be transmitted directly to a guest's mobile device 6 using email, text message, etc.

In step S5, the mobile device 6 request access to the BeoCloud service 4, using the unique URL as session identifier, and after verification the BeoCloud service 4 grants access to the session identified by the URL. The web page of the jukebox session is then loaded directly into the web browser client 7 on the mobile device 6.

In step S6, the guest may interact bidirectionally with the web page to provide preferences to the BeoCloud service 4 as will be discussed below. It is noted that steps S5 and S6 can be performed with any Internet connected device.

In step S7, the entertainment system 1 (in this case the loudspeakers) will query the dynamic playlist and playback the next song in the list. The song may in principle be stored locally in the entertainment system 1, but is preferably streamed directly from a music streaming service provider 2.

Figure 3:
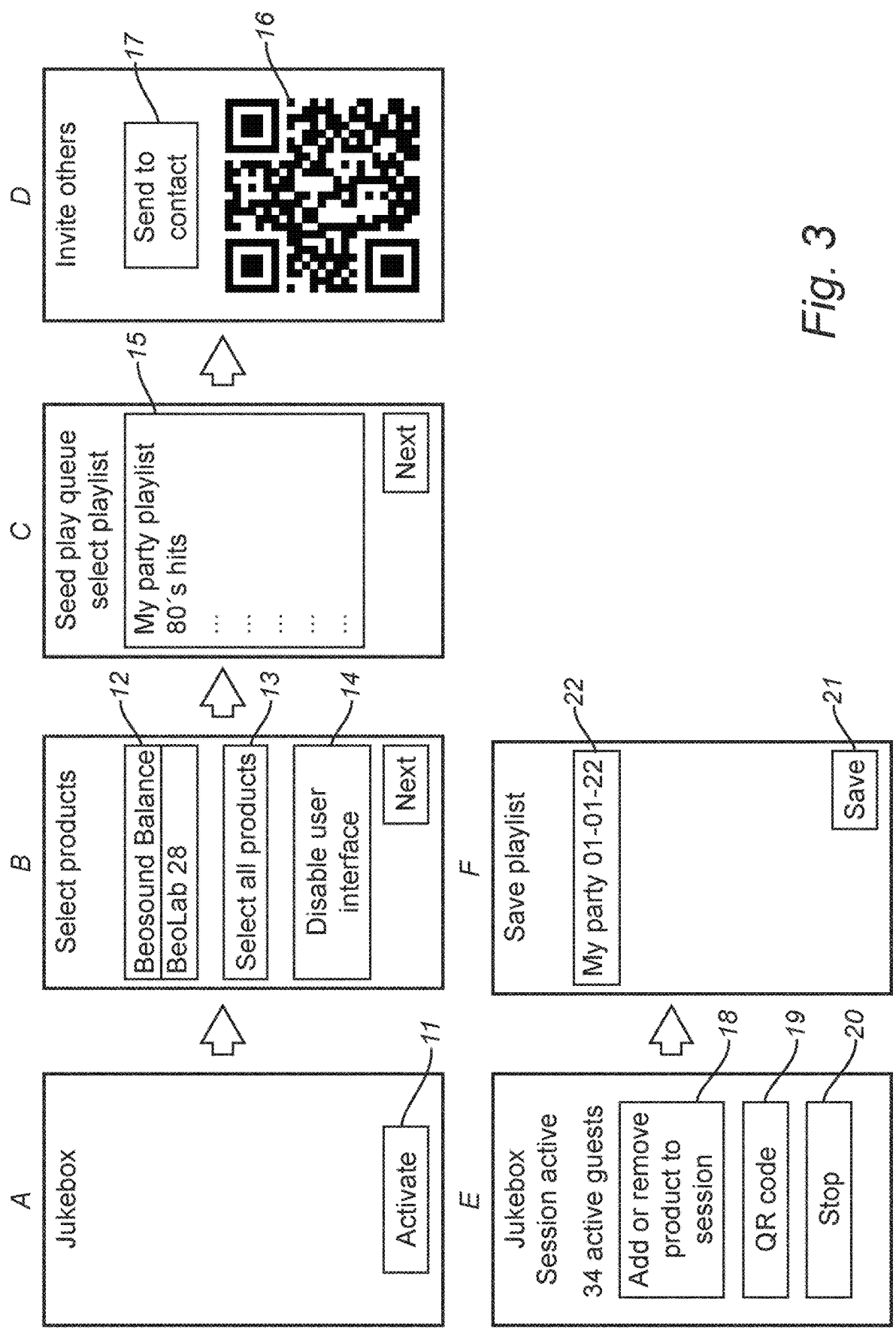
FIG. 3 is a series of screen-shots of the host application in FIG. 1.

Turning now to FIG. 3, the process in FIG. 2 will be discussed in more detail from the perspective of the host using the hosting app 5, with reference to FIGS. 3A-3F illustrating screen shots of the hosting app 5.

First (FIG. 3A) the host launches the hosting app 5 on his device (laptop, smartphone, stationary computer, etc.). The host then activates jukebox mode by selecting a designated button 11, here labelled "Activate".

Next (FIG. 3B) the host is presented with a list of entertainment system components, such as loudspeakers (buttons 12). The host can select one or more loudspeakers to be included in the jukebox session and thus play in synchrony. The host can also select all loudspeakers (button 13) or a predefined subset of loudspeakers e.g. "First floor" or "Outdoor". The host can also use a button 14 to disable a specific component's user interface, either individually or collectively, so that guests are not able to change the volume, skip tracks or stop the playback by physically interacting with e.g. one of the loudspeakers. Only the host can control Play/Pause and volume from within the hosting app 5.

Next (FIG. 3C) the host may initiate (seed) the playlist with an already stored playlist 15, here indicated as "80's hits", to start playback without further delay. Alternatively, the host may skip this step and not seed the playlist. Music will then not start until users are connected and add songs to the empty playlist. Optionally, the host can also impose certain restrictions to the songs that can be added, such as maximum duration, excluded genres (e.g., Christmas songs outside Christmas season), etc.

In the next stage (FIG. 3D) the hosting app 5 displays a unique QR code 16 for the jukebox session received from the BeoCloud service 4. As mentioned, the QR code includes a dynamically generated link (URL) to a web page hosted by the BeoCloud service 4. The QR code can be scanned by guests using e.g. a smartphone camera. The hosting app 5 may also provide a button 17 for transmitting the URL of the jukebox session directly to one or more contact persons, e.g. by email, text message, etc.

When a jukebox session is active (FIG. 3E) the hosting app 5 may display various options, in the illustrated case including:
1. to modify the number of speakers included in the session (button 18)
2. to again display the QR code to add further guests (button 19), and
3. to stop the active jukebox session (button 20), thereby stopping playback on the speakers and making the jukebox session web page unavailable.

When the jukebox session is stopped (FIG. 3F) the host can use button 21 to save all the tracks that were played (and queued) during the jukebox session as a playlist for future reference. A saved playlist may be given a default playlist name 22 including the date and time for when the jukebox mode was enabled.

Figure 4:
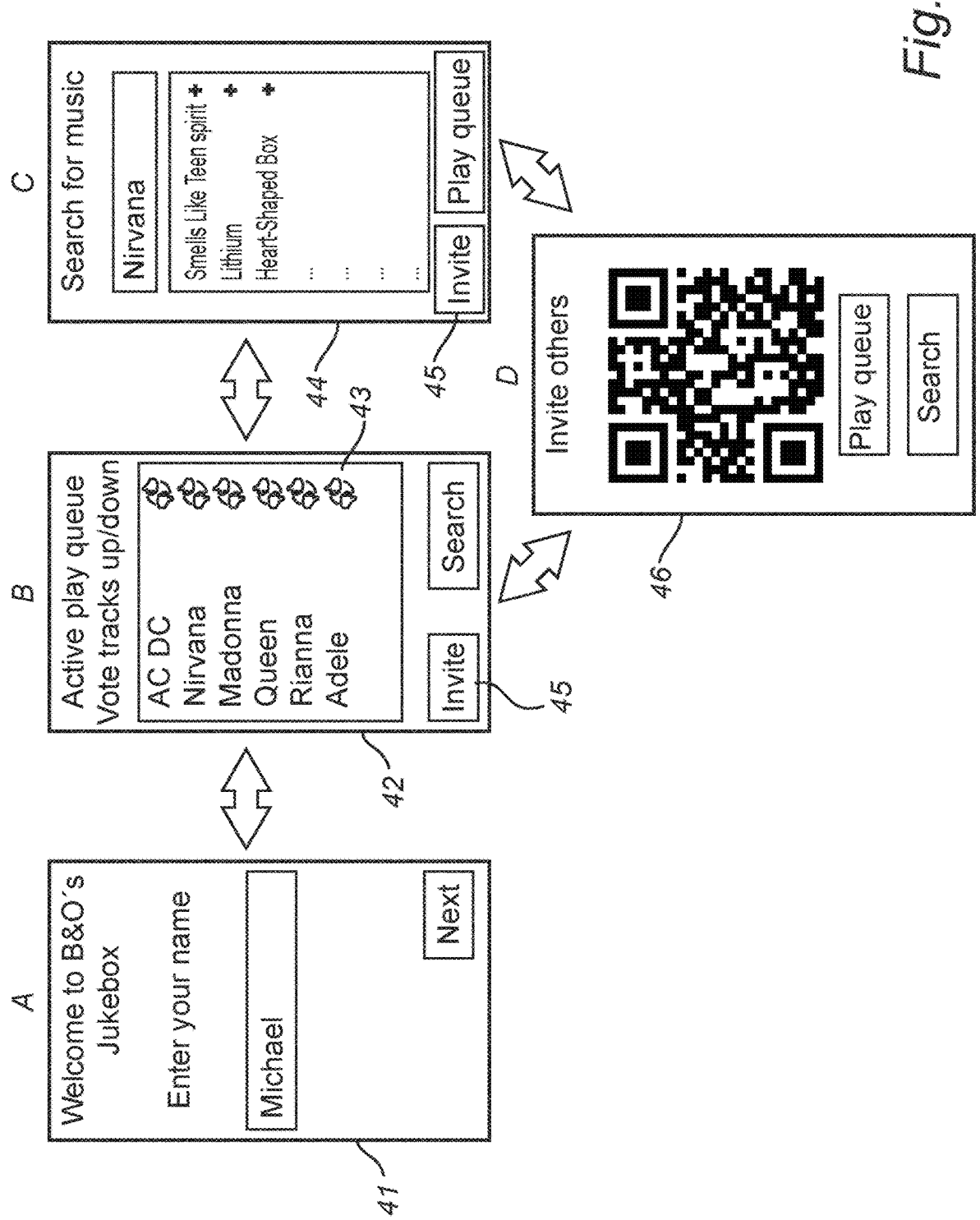
FIG. 4 is a series of screen-shots of the Web browser in FIG. 1.

Turning now to FIG. 4, the process in FIG. 2 will be discussed in more detail from the perspective of a guest using a mobile device 6 running a web browser 7, with reference to FIGS. 4A-4D illustrating screenshots of the browser 7.

In the first screenshot 41 (FIG. 4A), the guest has just been directed to the URL of the jukebox session web page. As mentioned before, the guest may have scanned the QR code provided to the hosting app 5, or may have received the URL directly from the host e.g. via a text message or email. In the illustrated example, the webpage immediately requests a username. This is of course not necessary from a technical point of view, but may improve the interaction between guests during the jukebox session.

After entering the jukebox session, the guest will have access to several different web pages.

The main page 42 (FIG. 4B) displays the current active playlist 43. The playlist shows the metadata for the tracks (for example genre, artist name, album name, song name, total time, publication year and others). The guest cannot remove songs from the playlist, and direct interaction like next and previous is not supported. Instead, for each song, the guest is given the option to vote the song up (played sooner) or down (played later). Each song can only be voted up or down once by each guest, and the guest can remove his/her own vote(s). Guest input is communicated to the BeoCloud service 4, which will dynamically modify the playlist order, so that the track with the most up-votes is played next. If tracks have the same number of votes the track that was first added to the playlist may be played.

Another web page 44 (FIG. 4C) allows the guest to search for music among the available content. The search function may be provided in a conventional manner, and allow search e.g. by entering album, song, artist name or genre, which results in a list of songs. For example, the web page may provide a proprietary user interface to an API of a cloud-based streaming service 2. Using the interface, the guest may request to add one or several songs to the active playlist. Requests may be subject to restrictions implemented by the jukebox session, e.g. in terms of playback time, genre, etc. The BeoCloud service 4 will receive the requests and modify the playlist, e.g. by appending new songs to the back of the playlist.

Both pages 42 and 44 have a button 45 for inviting additional guests. By pressing the button 45, the guest is directed to another web page 46 (FIG. 4D) which allows the guest to share the QR code or URL with additional guests. This function may be activated/deactivated by the hosting app 5.

In one implementation, a further webpage provides a high score list indicating which guests have provided the most votes and/or which guests have received the most votes for the songs they have added to the list.

Unless specifically stated otherwise, as apparent from the following discussions, it is appreciated that throughout the disclosure discussions utilizing terms such as "processing", "computing", "calculating", "determining", "analyzing" or the like, refer to the action and/or processes of a computer hardware or computing system, or similar electronic computing devices, that manipulate and/or transform data represented as physical, such as electronic, quantities into other data similarly represented as physical quantities.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

The person skilled in the art realizes that the present invention by no means is limited to the preferred embodiments described above. On the contrary, many modifications and variations are possible within the scope of the appended claims. For example, many additional features may be implemented in the jukebox web page, allowing additional interaction between guests. Also, more sophisticated voting rules may be implemented, involving for example alternatingly prioritizing specific guests.

The invention claimed is:

1. A system for providing a multi-user media experience, comprising:
    a jukebox service running on a server accessible through a data network;
    an entertainment system connected to the server;
    a hosting application connected to the server and configured to allow a user to set up a jukebox session;
    said jukebox service being configured to:
    receive instructions from the hosting application to create a jukebox session,
    communicate a session identifier to the hosting application,
    receive a connection request from at least one mobile device, each request including the session identifier,
    grant each mobile device access to the jukebox session,
    receive user input via the mobile devices, and
    communicate instructions to the entertainment system to playback media content based on the user input.

2. The system of claim 1, wherein the instructions received from the hosting application includes an identifier of the entertainment system.

3. The system of claim 1, wherein the jukebox session includes a dynamic list of media content items for playback, wherein the order of media content items in the list is based on requests received from the mobile devices.

4. The system of claim 1, wherein the jukebox service is configured to interact bidirectionally with the at least one mobile device.

5. The system of claim 1, wherein the entertainment system includes circuitry for wireless communication with the server.

6. The system of claim 1, wherein the jukebox service communicates with the entertainment system via a communication hub allowing push communication with the entertainment system.

7. The system of claim 6, wherein the communication hub is based on Internet of Things, IoT, technology.

8. The system of claim 1, wherein the entertainment system includes a set of synchronized loudspeakers, one loudspeaker in the set being a leader loudspeaker, and other loudspeakers in the set being follower loudspeakers, wherein the leader loudspeaker is configured to communicate with the jukebox service, and wherein the follower loudspeakers are configured to communicate with the leader loudspeaker.

9. The system of claim 1, wherein the entertainment system is separately connected to a media content provider, and configured to download requested media content from said media content provider.

10. The system of claim 9, wherein the jukebox session further includes an interface for accessing the content provider, allowing a user to browse available media content to base requests on.

11. The system of claim 1, wherein the hosting application is configured to transmit the session identifier to the mobile devices.

12. The system of claim 1, wherein the hosting application is configured to display a Quick Response, QR, code representing the session identifier, thereby allowing the mobile devices to receive the session identifier by scanning the QR code.

13. The system of claim 1, wherein the session identifier includes a Uniform Resource Locator, URL, of the jukebox session.

14. The system of claim 1, wherein access is granted only after verifying the session identifier.

15. A method for providing a multi-user media experience using a jukebox service running on a server accessible through a data network, the method comprising:
    receiving instructions from a hosting application to set up a jukebox session, the instructions specifying an entertainment system;
    communicating a session identifier to the hosting application;
    receiving a connection request from at least one mobile device, each request including the session identifier;
    granting each mobile device access to the jukebox session;
    receiving user input via the mobile devices; and
    communicating instructions to the entertainment system to playback media content based on the user input.

16. The method according to claim 15, wherein the hosting application transmits the session identifier to the mobile devices.

17. The method of claim 15, wherein the hosting application displays a Quick Response, QR code representing the session identifier, thereby allowing the mobile devices to receive the session identifier by scanning the QR code.

18. The method of claim 15, wherein access is granted only after verifying the session identifier.

19. A non-transitory computer readable medium including computer program code portions configured to perform the method according to claim 15 when executed on a computer processor.

* * * * *